UNITED STATES PATENT OFFICE.

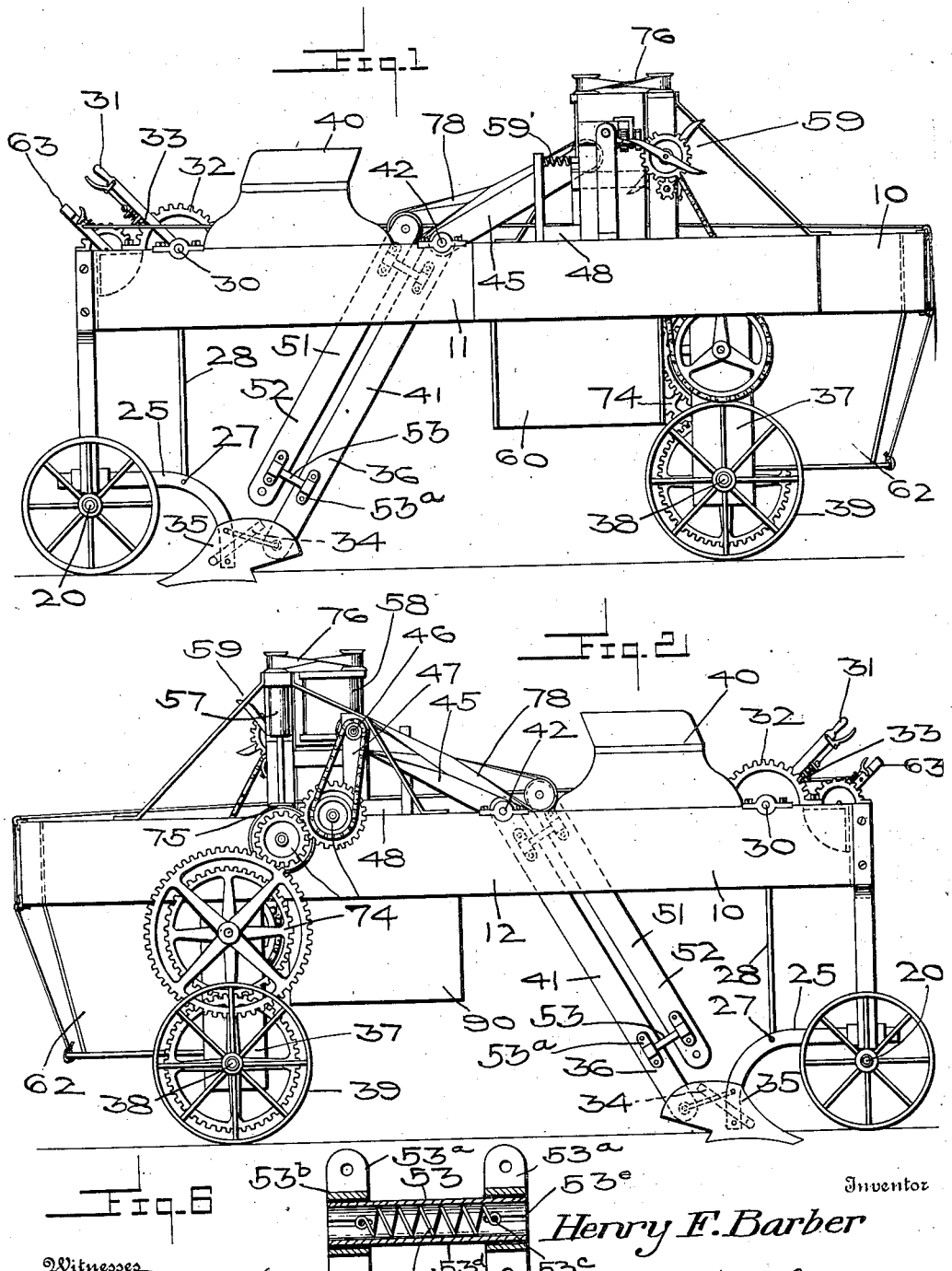

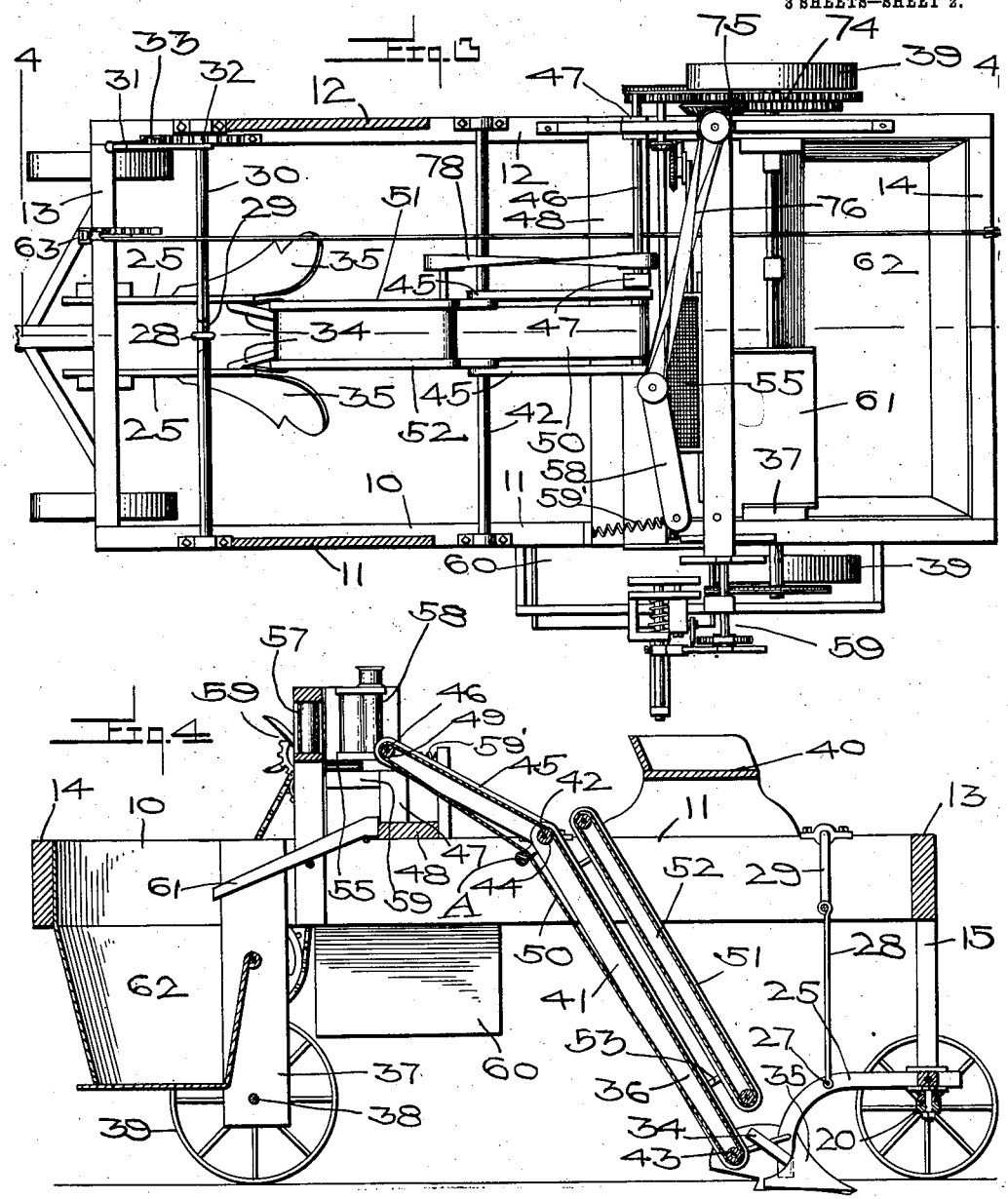

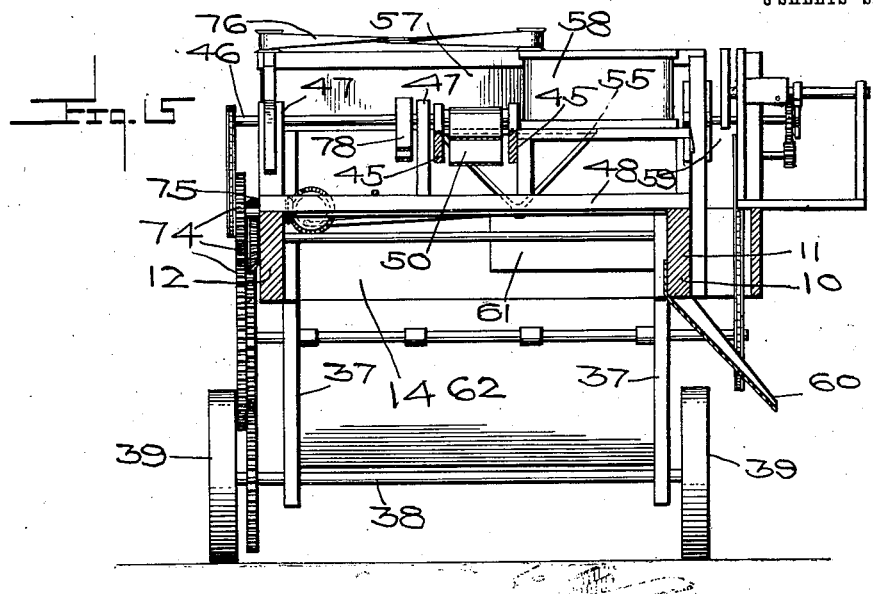

HENRY F. BARBER, OF EDISON, NEBRASKA.

BEET-HARVESTING MECHANISM.

968,522.   Specification of Letters Patent.   Patented Aug. 30, 1910.

Application filed January 11, 1909. Serial No. 471,666.

*To all whom it may concern:*

Be it known that I, HENRY F. BARBER, a citizen of the United States, residing at Edison, in the county of Furnas and State of Nebraska, have invented certain new and useful Improvements in Beet-Harvesting Mechanism, of which the following is a specification.

This invention relates to farm machines and more particularly to beet harvesters, and has for its object to provide a harvester which will include a novel elevator arrangement receiving the beets from an excavator and transferring them to a topper.
Another object is to provide a structure of elevator which will be provided to permit of vertical adjustment of the excavating mechanism.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a side elevation of the machine, Fig. 2 is a view showing the opposite side of the machine, Fig. 3 is a top plan, the seat being removed, Fig. 4 is a longitudinal section on the line 4—4, of Fig. 3, Fig. 5 is a transverse section taken forwardly of the transverse conveyers, Fig. 6 is a detail section showing the mounting of the elevators.

It will be understood that, while this invention relates particularly to an elevating and conveying mechanism, I have also shown and described an excavating and topping mechanism for which the present elevating and conveying mechanism has been especially designed.
Referring now to the drawings, there is shown a rectangular horizontally disposed frame 10 including parallel side members 11 and 12, and front and rear members 13 and 14 respectively, supported in front on a wheel truck 20 to which are pivotally attached the front ends of a pair of plow beams 25, connected to the rear by a transverse bars 27 having a link 28 pivoted thereto. The link extends upwardly and is piv-
oted to the crank 29 of a transversely extending shaft 30 journaled upon the forward portions of the side members 11 and 12.

A hand lever 31 is secured to the shaft 30 for movement thereof and a rack 32 is provided for engagement by a dog 33 to hold the hand lever at different points of its movement. It will thus be observed that the shaft 30 may be moved to raise and lower the rearward portions of the plow beams 25. Shares 35 are carried by the rearward extremities of the plow beams and have inwardly directed mold boards which are in the form of bars 34 and which are arranged to discharge against the lower end of a conveyer 36 which extends upwardly and rearwardly as shown.

Depending hangers 37 are carried by the side members 11 and 12 adjacent to their rear ends and have a rear axle 38 engaged therein and carrying rear traction wheels 39 as shown.

Rearwardly of the shaft 30, a seat 40 is mounted upon the side members 11 and 12 and from this seat the hand lever 31 may be reached.

The elevator 36 consists of two side members 41 journaled at their upper ends upon a transverse rod 42 secured upon the frame 10, this elevator being connected with the rearward portions of the plow beams.

A roller 43 is journaled upon the lower ends of the side members 41 and a similar roller 44 is journaled upon the rod 42 between the side members. A pair of side members 45 have their lower ends journaled upon the rod 42 outwardly of the side members 41, and at their upper ends, the members 45 are mounted upon a transverse rod 46 supported in brackets 47 located upon a transverse board 48 secured to the upper surfaces of the side members 11 and 12 of the frame. This rod 46 is revoluble and extends outwardly beyond the side member 12 of the frame as shown and is actuated by a train of gears 74 from the traction wheels 39. A roller 49 is mounted upon the shaft 46 between the side members 45 and a conveyer belt 50 is engaged with the rollers 43, 44 and 49, a supporting roller A being provided for the under portion of the belt 50 at the shaft 42. There is thus produced an elevator having a vertically movable lower portion as shown.

An elevator 51 actuated by a belt 78 attached to the shaft 46 is mounted in parallel relation to the movable lower portion of the first described elevator 36, this elevator 51 including side members 52, these side members 52 lying in parallel relation to the members 41 and being held normally against movement away from the members 41 by means of helical springs 54 located within connecting members 53. These connecting members consist of brackets 53ª, each attached to one of the side members of each conveyer, these brackets including circular sleeves 53ᵇ, traversed by pins 53ᶜ, each corresponding pair of brackets having engaged in its sleeves a tube 53ᵈ.

The helical springs 54 are located within the tubes 53ᵈ and are engaged at their ends with the pins 53ᶜ, the tubes being slotted as indicated at 53ᵉ for movement of the conveyers with the bracket, with respect to the tubes 53ᵈ.

The two elevators lie normally in spaced relation, as shown, to receive beets from the plows therebetween, the movement of the upper elevator 51 permitting of the reception of beets of various sizes. By reason of the fact that this upper elevator terminates at the rod 42, the portion of the conveyer belt 50 lying between the side members 45 extends rearwardly beyond the elevator 51. Beyond this elevator the beets are disposed upon a transverse shaker 55 arranged for movement of the beets laterally toward the side member 11.

A transversely extending vertically disposed conveyer 57 is located rearwardly of the shaker 55 and is arranged to engage beets located upon the shaker, the shaker terminating short of the end of the conveyer adjacent to the side member 11 as illustrated in the drawings. Forwardly of the shaker there is a short transversely extending vertically disposed conveyer 58 extending between the side of the machine and the adjacent side member 45 of the elevator described in the foregoing and indicated at 36. This conveyer 58 is pivoted at its inner end for lateral movement of its outer end toward and away from the conveyer 57 and is held yieldably against movement away from the conveyer 57 by means of springs 59'. The conveyers 57 and 58 are actuated by a gear train 74 connected to the traction wheel 39, the motion being transmitted from the gear train 74 by means of bevel gears 75 and belt 76 respectively. It will thus be observed that beets passing from the rearward end of the conveyer belt 50 upon the shaker will engage their tops against the conveyer 57, which, traveling toward the side of the machine, will turn the beets laterally and they will be engaged and carried between the conveyers 57 and 58 which will move them top first laterally of the machine, toward a topping mechanism 59. This topping mechanism, which may be operated by any suitable means connected to the running gear, is no part of my present invention and is therefore not shown and described in detail herein. It is preferably of the construction contemplated in my co-pending application, Serial Number 511,330. From the cutting mechanism the tops of the beets fall into a discharge chute 60, while the beets are deposited upon a shaker 61, which transfers them to a dump 62 arranged for coöperation by a foot lever 63 located in position for operation by an occupant of the seat 40.

What is claimed is:—

1. A machine of the class described comprising plowing elements, vertically spaced elevators arranged to receive vegetables from the plowing elements, the upper of said elevators being movable away from the lower elevator, means for holding the upper elevator yieldably against movement away from the lower elevator, transverse vertically disposed conveyers arranged to receive vegetables therebetween from the elevators, and means located at the discharge end of the transverse conveyers for topping the vegetables.

2. In a beet harvester the combination with a plow, of spaced upwardly extending elevators arranged to receive vegetables from the plow therebetween, one of said elevators being extended upwardly beyond the other, a pair of vertically disposed parallel conveyers arranged to receive vegetables therebetween from the last named elevator, and means located at the discharge end of the transverse conveyers for topping the vegetables.

3. In a beet harvester, the combination with a plow, of an upwardly and rearwardly extending conveyer pivotally connected with the plow, a second conveyer disposed in parallel relation to the first named conveyer, connections between the conveyers for movement of the second named conveyer toward and away from the first named conveyer, springs arranged to hold the second named conveyer yieldably against movement away from the first named conveyer, said first named conveyer having an extension at its upper portion projecting beyond the second named conveyer and directed diagonally rearwardly, a third conveyer located rearwardly of the said extension and in position to receive thereagainst the tops of beets passing from the said extension, a shaker located beneath the said extension in position to receive beets from the extension thereupon, a fourth conveyer disposed vertically forwardly of the third conveyer and in position for the reception of beets between it and the third conveyer, said fourth conveyer being arranged for movement toward and away from the third conveyer, springs arranged to hold the fourth conveyer yieldably against movement away from the third conveyer, and a topping mechanism located at the delivery end of the third and fourth conveyers.

In testimony whereof I affix my signature, in presence of two witnesses.

HENRY F. BARBER.

Witnesses:
JOSEPH N. MCNEW,
EDGAR A. LUKE.